United States Patent [19]
Ueda

[11] 3,949,697
[45] Apr. 13, 1976

[54] MARINE FENDER ASSEMBLY HAVING A MULTISTAGE SHOCK-ABSORBING PERFORMANCE

[75] Inventor: Shigeo Ueda, Yokohama, Japan

[73] Assignee: Bridgestone Tire Company Limited, Tokyo, Japan

[22] Filed: Dec. 27, 1974

[21] Appl. No.: 536,780

[30] Foreign Application Priority Data
Dec. 28, 1973 Japan.................................. 49-1363

[52] U.S. Cl.................................. 114/219; 293/60
[51] Int. Cl.$^2$......................................... B63B 59/02
[58] Field of Search............ 114/219; 61/48; 293/1, 293/60, 62, 64, 73, 75, 78; 52/717, 718

[56] References Cited
UNITED STATES PATENTS

| | | | |
|---|---|---|---|
| 2,910,033 | 10/1959 | Weisburg............................ | 114/219 |
| 3,335,689 | 8/1967 | Hein.................... | 114/219 |
| 3,687,502 | 8/1972 | Loew..................................... | 293/62 |

*Primary Examiner*—Trygve M. Blix
*Assistant Examiner*—Jesus D. Sotelo
*Attorney, Agent, or Firm*—Sughrue, Rothwell, Mion, Zinn & Macpeak

[57] ABSTRACT

A marine fender assembly comprises first, second and third shock-receiving members and first, second and third supporting members integrally formed therewith and has an excellent multistage shock-absorbing performance.

3 Claims, 2 Drawing Figures

U.S. Patent  April 13, 1976  3,949,697
FIG_1
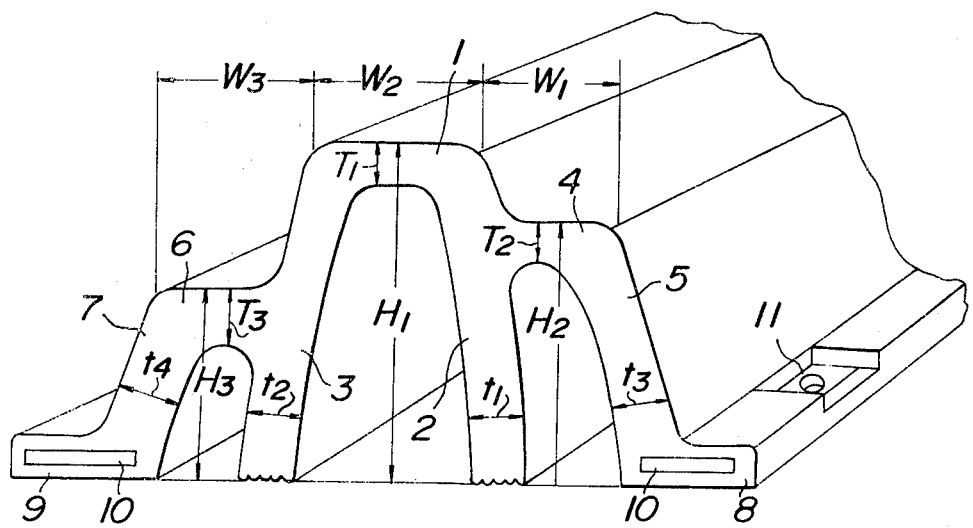
FIG_2
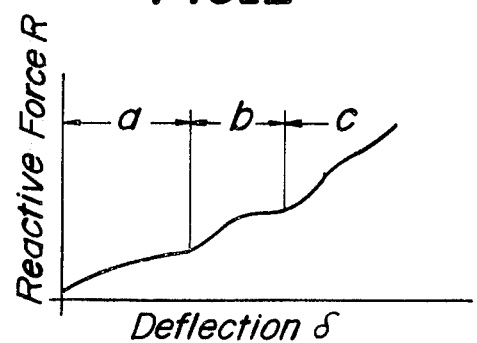

MARINE FENDER ASSEMBLY HAVING A MULTISTAGE SHOCK-ABSORBING PERFORMANCE

The present invention relates to a marine fender assembly having a multistage shock-absorbing performance.

In general, marine fenders are used to absorb the berthing impact energy of a vessel when the vessel is berthed to a quay, a dolphin, a pier and the like (hereinafter simply referred to as quay wall), so as to protect the side board of the vessel during berthing and mooring of the vessel.

However, since various kinds of vessels having different sizes are berthed to the quay wall, it is impossible to provide a sufficient shock-absorbing performance in response to the size of the vessel by means of single marine fender.

An object of the present invention is to solve the above mentioned drawback and to provide a marine fender assembly developing an effective shock-absorbing performance in response to a size of a vessel during berthing and morring thereof.

According to the present invention, an improved multistage shock-absorbing performance can be achieved in response to the size of the berthing vessel with the use of the single marine fender assembly.

Namely, the present invention consists in a marine fender assembly comprising a first shock-receiving member facing to a side board of a vessel; a pair of first supporting members integrally formed with said first shock-receiving member, said first supporting members extending from said first shock-receiving member toward a quay wall while slightly diverging from each other and forming an inverted U-shape cross-section with said first shock-receiving member; second and third shock-receiving members extending outwardly from said first supporting members at different levels, respectively; and second and third supporting members integrally formed with said second and third shock-receiving members, said second and third supporting members extending from said second and third shock-receiving members toward said quay wall while slightly diverging from each other, respectively, all of said supporting members being in contact with said quay wall and each of said second and third supporting members being provided at its end with a mounting flange for securing said marine fender assembly to said quay wall.

For a better understanding of the invention, reference is made to the accompanying drawings, in which:

FIG. 1 is a perspective view of an embodiment of the marine fender assembly according to the present invention; and FIG. 2 is a graph showing a relation between deflection and reactive force in energy absorption by the marine fender assembly according to the present invention.

The marine fender assembly of the present invention is based on a trapezoidal cross-section widely adopted to the conventional fenders and made of elastomer such as natural and synthetic rubbers. That is, the marine fender assembly comprises a first shock-receiving member 1 facing to a side board of a vessel and a pair of first supporting members 2 and 3 integrally formed with the first shock-receiving member 1 as shown in FIG. 1. These first supporting members 2 and 3 extend from the first shock-receiving member 1 toward a quay wall while slightly diverging from each other and form an inverted U-shape cross-section with the first shock-receiving member 1. As shown in FIG. 1, the shock receiving member 1 has a substantially flat face projected in a plane substantially parallel to the quay wall.

This first supporting members 2 and 3 are in contact with the quay wall at the ends thereof. On these ends are provided rugged portions 11 as shown in FIG. 1 in order to prevent slipping along the surface of the quay wall. If desired, these ends may be received in grooves provided on the quay wall.

The supporting member 2 provides with a second shock-receiving member 4 extending outwardly from the supporting member 2 and a second supporting member 5 integrally formed with the second shock-receiving member 4 and forms an inclined and inverted U-shape cross-section with these second members 4 and 5.

The supporting member 3 provides with a third shock-receiving member 6 extending outwardly from the supporting member 3 at a level lower than that of the second shock-receiving member 4 and a third supporting member 7 integrally formed with the third shock-receiving member 6 and forms an inclined and inverted U-shape cross-section with these third members 6 and 7.

Each of the second and third supporting members 5 and 7 extends toward the quay wall while slightly diverging from each other. Each of the second and third supporting members 5 and 7 is provided at its end with mounting flanges 8 and 9 in the same plane as the ends of the supporting members 2 and 3, whereby the marine fender assembly is mounted on the quay wall.

In order to ensure such mounting, core bars 10 are embedded in the mounting flanges 8 and 9, respectively, according to the common technique adaptable for trapezoidal fenders, and also washer seats 11 are provided on the outer surfaces of the mounting flanges 8 and 9 in positions.

The invention will be explained in detail with reference to the following example.

The marine fender assembly of the present invention is secured to the quay wall through the mounting flanges 8 and 9 by means of anchor bolts (not shown).

When a small boat is berthed and moored to the quay wall, the side board of the boat firstly contacts with the first shock-receiving member 1, during which a reactive force in response to the small boat is caused under an elastic deformation of the first supporting members 2 and 3. As a result, a satisfactory energy absorption is effected in a region $a$ shown in FIG. 2 through the gradual increases of the reactive force.

Similarly, when a middle-sized ship is berthed and moored to the quay wall, the second shock-receiving member 4 serves to hold the momentum in response to the middle-sized ship through the elastic deformation of the first shock-receiving member 1 and produces an appropriately medium reactive force and as a result, a satisfactory energy absorption in response to the berthing shock of the ship is effected in a region $b$ shown in FIG. 2.

Furthermore, when a large vessel is berthed and moored to the quay wall, the third shock-receiving member 6 finally contacts with the side board of the vessel through the deformations of the first and second shock-receiving members 1 and 4 and as a result, a satisfactory energy absorption in response to the berthing shock of the vessel is effected in a region $c$ shown in FIG. 2 under a high reactive force.

Thus, the energy absorption as shown in FIG. 2 can be obtained by the marine fender assembly of the present invention in response to the size of the berthing vessel under the reactive force adapted to the size of the vessel.

A typical dimension of the marine fender assembly of the present invention will be given as follows.

|  | A(mm) | B(mm) |
|---|---|---|
| Height from the quay wall to the first shock-receiving member 1 ($H_1$) | 250 | 500 |
| Height from the quay wall to the second shock-receiving member 4 ($H_2$) | 200 | 400 |
| Height from the quay wall to the third shock-receiving member 6 ($H_3$) | 150 | 300 |

In general, these heights $H_1$, $H_2$ and $H_3$ should preferably satisfy the following relations.

$H_2 = (0.7 \text{ to } 0.9) \times H_1$ $H_3 = (0.5 \text{ to } 0.7) \times H_1$ The widths $W_1$, $W_2$ and $W_3$ of the shock-receiving members 1, 4 and 6 are preferably selected from the range $(0.4 \text{ to } 0.8) \times H_1$, respectively.

The thicknesses $T_1$, $T_2$ and $T_3$ of the shock-receiving members 1, 4, 6 are preferably selected from the range $(0.1 \text{ to } 0.4) \times H_1$ and the relation of $T_1 \leq T_2 \leq T_3$, respectively.

Moreover, the thicknesses $t_1$, $t_2$, $t_3$ and $t_4$ of the supporting members 2, 3, 5 and 7 are preferably selected from the range $(0.1 \text{ to } 0.4) \times H_1$ and relation of $t_1 = t_2 \leq t_3 \leq t_4$, respectively.

According to the present invention, even if various kinds of vessels are berthed to the quay wall, the marine fender assemblies worked relating to the length of the vessel cooperates with each other so as to provide an effective energy absorption in response to the size of the vessel.

What is claimed is:

1. A marine fender assembly having a multistage shock-absorbing performance for mounting on a stationary object such as a quay wall, comprising a first shock-receiving member having a substantially flat face in a plane substantially parallel to said wall and facing a side board of a vessel; a pair of first supporting members integrally formed with said first shock-receiving member, said first supporting members extending from said first shock-receiving member toward said quay wall while slightly diverging from each other and forming an inverted U-shape cross-section with said first shock-receiving member; second and third shock-receiving members extending outwardly from said first supporting members at different levels, respectively, each of said levels substantially parallel to said wall; and second and third supporting members integrally formed with said second and third shock-receiving members, said second and third supporting members extending from said second and third shock-receiving members toward said quay wall while slightly diverging from each other, respectively, all of said supporting members being in contact with said quay wall and each of said second and third supporting members being provided at its end with a mounting flange for securing said marine fender assembly to said quay wall.

2. A marine fender assembly as claimed in claim 1 wherein said marine fender assembly satisfies the following conditions; i.e.

$H_2 = (0.7 \text{ to } 0.9) \times H_1$, and $H_3 = (0.5 \text{ to } 0.7) \times H_1$ wherein $H_1$ is a height from said quay wall to said first shock-receiving member, $H_2$ is a height from said quay wall to said second shock-receiving member and $H_3$ is a height from said quay wall to said third shock-receiving member.

3. A marine fender assembly as claimed in claim 2 and further satisfying the following three conditions; i.e.

1. $W_1$, $W_2$ and $W_3 = (0.4 \text{ to } 0.8) \times H_1$,
2. $T_1$, $T_2$ and $T_3 = (0.1 \text{ to } 0.4) \times H_1$, and $T_1 \leq T_2 \leq T_3$,
3. $t_1$, $t_2$ $t_3$ and $t_4 = (0.1 \text{ to } 0.4) \times H_1$, and $t_1 = t_2 \leq t_3 \leq t_4$ wherein $H_1$ is a height from said quay wall to said first shock-receiving member, $W_1$, $W_2$ and $W_3$ are widths of said first, second and third shock-receiving members, respectively, $T_1$, $T_2$ and $T_3$ are thicknesses of said first, second and third shock-receiving members, respectively, and $t_1$, $t_2$, $t_3$ and $t_4$ are thicknesses of said first, second and third supporting members, respectively.

* * * * *